(12) United States Patent
Shimazawa et al.

(10) Patent No.: US 7,035,057 B2
(45) Date of Patent: Apr. 25, 2006

(54) MAGNETORESISTIVE EFFECT THIN-FILM MAGNETIC HEAD AND MANUFACTURING METHOD OF MAGNETORESISTIVE EFFECT THIN-FILM MAGNETIC HEAD

(75) Inventors: Koji Shimazawa, Tokyo (JP); Shunji Saruki, Tokyo (JP)

(73) Assignee: TDK Corporation, Tokyo (JP)

( * ) Notice: Subject to any disclaimer, the term of this patent is extended or adjusted under 35 U.S.C. 154(b) by 774 days.

(21) Appl. No.: 09/899,937

(22) Filed: Jul. 9, 2001

(65) Prior Publication Data

US 2002/0027751 A1    Mar. 7, 2002

(30) Foreign Application Priority Data

Jul. 10, 2000    (JP)    .............................. 2000-208403

(51) Int. Cl.
*G11B 5/39*    (2006.01)
(52) U.S. Cl. ..................................... 360/320
(58) Field of Classification Search ................ 360/320, 360/324.1, 324.11, 324.12, 319, 321, 322, 360/234.5, 324.2; 29/603.11, 603.12, 603.14, 29/603.15, 603.13
See application file for complete search history.

(56) References Cited

U.S. PATENT DOCUMENTS

| | | | |
|---|---|---|---|
| 5,296,982 A * | 3/1994 | Terada et al. ............. | 360/234.5 |
| 5,568,335 A * | 10/1996 | Fontana et al. ............. | 360/320 |
| 5,668,688 A * | 9/1997 | Dykes et al. ............. | 360/324.1 |
| 5,696,656 A * | 12/1997 | Gill et al. .................... | 360/319 |
| 5,726,837 A * | 3/1998 | Nakatani et al. .......... | 360/324.2 |
| 5,828,530 A * | 10/1998 | Gill et al. .................... | 360/319 |
| 5,898,548 A | 4/1999 | Dill et al. | |
| 6,046,890 A * | 4/2000 | Yamada et al. ............. | 360/323 |
| 6,381,107 B1 * | 4/2002 | Redon et al. ............. | 360/324.2 |
| 6,385,012 B1 * | 5/2002 | Sasaki ...................... | 360/234.5 |

(Continued)

FOREIGN PATENT DOCUMENTS

EP    0 782 129 A2    7/1997

(Continued)

OTHER PUBLICATIONS

W.P. Pratt, Jr., et al., "Perpendicular Giant Magnetoresistance of Ag/Co Multilayers", Physical Review Letters, vol. 66, No. 23, Jun. 10, 1991, pp. 3060-3063.

*Primary Examiner*—Angel Castro
*Assistant Examiner*—Christopher R. Magee
(74) *Attorney, Agent, or Firm*—Buchanan Ingersoll PC

(57) ABSTRACT

An MR thin-film magnetic head includes a lower shield layer, a lower gap layer made of a nonmagnetic electrically conductive material and laminated on the lower shield layer, an MR multilayer in which a current flows in a direction perpendicular to surfaces of layers of the magnetoresistive effect multilayer, the MR multilayer being laminated on the lower gap layer, an upper gap layer made of a nonmagnetic electrically conductive material and laminated on the MR multilayer, an insulation gap layer made of an insulation material and formed at least between the lower shield layer and the upper gap layer, an upper shield layer laminated on the upper gap layer and the insulation gap layer, and an additional insulation layer formed so that a distance between the lower shield layer and the upper gap layer increases at a location where the MR multilayer is absent.

14 Claims, 12 Drawing Sheets

U.S. PATENT DOCUMENTS

| | | | |
|---|---|---|---|
| 6,487,044 B1 * | 11/2002 | Honda | 360/234.5 |
| 6,563,678 B1 * | 5/2003 | Sato | 360/320 |
| 6,643,104 B1 * | 11/2003 | Shimazawa | 360/319 |
| 6,728,079 B1 * | 4/2004 | Shimazawa | 360/320 |

FOREIGN PATENT DOCUMENTS

| | | |
|---|---|---|
| JP | 04103014 | 4/1992 |
| JP | 11-175920 | 7/1999 |
| JP | 11-316919 | 11/1999 |

* cited by examiner

MAGNETORESISTIVE EFFECT THIN-FILM MAGNETIC HEAD AND MANUFACTURING METHOD OF MAGNETORESISTIVE EFFECT THIN-FILM MAGNETIC HEAD

FIELD OF THE INVENTION

The present invention relates to a magnetoresistive effect (MR) thin-film magnetic head that is applicable to a hard disk drive (HDD) apparatus and provided with a tunnel magnetoresistive effect (TMR) element or a current perpendicular to the plane giant magnetoresistive effect (CPP-GMR) element, in which a current flows in a direction perpendicular to surfaces of layers. The present invention also relates to a manufacturing method of the MR thin-film magnetic head.

DESCRIPTION OF THE RELATED ART

Recently, in order to satisfy the demand for higher recording density in an HDD apparatus, higher sensitivity and larger output of a thin-film magnetic head are required. A TMR element and a CPP-GMR element meet these requirements and are beginning to receive attention. The TMR element, disclosed in Japanese patent publication No. 04103014A for example, utilizes a ferromagnetic tunnel effect and has a multi-layered structure including a lower ferromagnetic thin-film layer, a tunnel barrier layer and an upper ferromagnetic thin-film layer. The CPP-GMR element is one type of GMR element of a multi-layered structure including a lower ferromagnetic thin-film layer, a nonmagnetic metal layer and an upper ferromagnetic thin-film layer. In the CPP-GMR element, however, a current flows in a direction perpendicular to the surfaces of laminated layers. Such CPP-GMR element is disclosed in, for example, W. P. Pratt, Jr. et al., "Perpendicular Giant Magnetoresistance of Ag/Co Multilayer," PHYSICAL REVIEW LETTERS, Vol. 66, No. 23, pp.3060–3063, June 1991.

These elements not only offer MR ratios several times greater than that of a general GMR element such as CIP (Current-In-Plane)-GMR element in which a current flows along the surface of layers, but also implements narrow gaps between layers without difficulty. The terms "lower" in "lower ferromagnetic thin-film layer" and "upper" in "upper ferromagnetic thin-film layer" are selectively used depending on the position of the layer relative to the substrate. In general, a layer is "lower" if this layer is close to the substrate, and "upper" if the layer is away from the substrate.

FIG. 1 illustrates a CIP-GMR element with a conventional structure seen from an air bearing surface (ABS).

In the figure, reference numeral 10 denotes a lower shield layer, 11 denotes a lower shield gap layer made of an insulation material, 12 denotes a GMR multilayer consisting of a lower ferromagnetic thin-film layer (free layer)/a non-magnetic metal layer/an upper ferromagnetic thin-film layer (pinned layer)/an anti-ferromagnetic thin-film layer, 13 denotes an upper shield gap layer formed of an insulation material, 14 denotes an upper shield layer, 15 denotes hard bias layers, and 16 denotes electrode layers, respectively.

A sense current flows in parallel to the surfaces of the layers of the GMR multilayer 12. The GMR multilayer 12 are insulated from the lower shield layer 10 by the lower shield gap layer 11, and from the upper shield layer 14 by the upper shield gap layer 13.

In order to more narrow the gap of such CIP-GMR element, the lower and upper shield gap layers 11 and 13 require to be formed of a very thin insulating material with a very high dielectric strength. However, such an insulating material is difficult to make and has been the bottleneck for providing a CIP-GMR element used in a high density HDD apparatus.

FIG. 2 illustrates a TMR element or a CPP-GMR element with a conventional structure, seen from the ABS.

In the figure, reference numeral 20 denotes a lower shield layer also serving as an electrode, 21 denotes a lower gap layer made of a metal material, which also serves as an electrode, 22 denotes a TMR layer with a multi-layered structure consisting of a lower ferromagnetic thin-film layer (free layer)/a tunnel barrier layer/an upper ferromagnetic thin-film layer (pinned layer)/an anti-ferromagnetic thin-film layer, or CPP-GMR layer with a multi-layered structure consisting of a lower ferromagnetic thin-film layer (free layer)/a nonmagnetic metal layer/an upper ferromagnetic thin-film layer (pinned layer)/an anti-ferromagnetic thin-film layer, 23 denotes an upper gap layer made of a metal material, which also serves as an electrode, 24 denotes an upper shield layer also serving as an electrode, 25 denotes hard bias layers, and 26 denotes an insulation gap layer made of an insulating material, respectively. Reference numeral 22a denotes extended parts of the lower ferromagnetic thin-film layer (free layer) extending from the TMR multilayer or the CPP-GMR multilayer to the hard bias layers 25 along the surfaces of layers of the TMR multilayer or the CPP-GMR multilayer.

The TMR element or CPP-GMR element is electrically connected between the lower shield layer 20 and the upper shield layer 24 so that a sense current flows in a direction perpendicular to the surfaces of the layers. Therefore, a narrow gap can be implemented without inviting dielectric breakdown of the gap layer. As a result, the line recording density can be greatly improved.

The important features required for an HDD apparatus are not only high recording density but also high data transfer rate. The transfer rate greatly relies on the rotational speed of a magnetic disk as well as the frequency characteristics of a write head and a read head.

FIG. 3 shows an equivalent circuit of the CIP-GMR element, and FIG. 4 shows an equivalent circuit of the TMR element or the CPP-GMR element.

As is apparent from FIG. 3, the CIP-GMR element has only an equivalent resistance $R_{GMR}$ of the GMR element across the output terminals and no other essential factor that may deteriorate its frequency characteristics. However, as shown in FIG. 4, the TMR element or the CPP-GMR element that utilizes the shield layers as the electrodes has not only an equivalent resistance $R_{TMR}$ of the TMR element or the CPP-GMR element across their output terminals but also a capacitance $C_{shield}$ between the shield layers and a capacitance $C_{TMR}$ of the TMR element or the CPP-GMR element itself across their output terminals. These resistance $R_{TMR}$ and capacitances $C_{TMR}$ and $C_{shield}$ form a low-pass filter causing serious deterioration of the frequency characteristics.

SUMMARY OF THE INVENTION

It is therefore an object of the present invention to provide an MR thin-film magnetic head having a TMR element or a CPP-GMR element for example and a manufacturing method of the MR thin-film magnetic head, whereby the frequency characteristics of the MR thin-film magnetic head can be greatly improved.

According to the present invention, an MR thin-film magnetic head includes a lower shield layer, a lower gap layer made of a nonmagnetic electrically conductive material and laminated on the lower shield layer, an MR multilayer in which a current flows in a direction perpendicular to surfaces of layers of the magnetoresistive effect multilayer, the MR multilayer being laminated on the lower gap layer, an upper gap layer made of a nonmagnetic electrically conductive material and laminated on the MR multilayer, an insulation gap layer made of an insulation material and formed at least between the lower shield layer and the upper gap layer, an upper shield layer laminated on the upper gap layer and the insulation gap layer, and an additional insulation layer formed so that a distance between the lower shield layer and the upper gap layer increases at a location where the MR multilayer is absent.

Since an additional insulation layer is formed so that a distance between the lower shield layer and the upper gap layer increases at a location where the MR multilayer is absent, the capacitance $C_{shield}$ between the lower shield layer and the upper shield layer decreases. This improves the frequency characteristics of the thin-film magnetic head greatly.

FIG. 5 illustrates a head output versus frequency characteristic when the capacitance $C_{shield}$ between the shield layers in the equivalent circuit of FIG. 4 is 6 pF, and FIG. 6 illustrates a head output versus frequency characteristic when the capacitance $C_{shield}$ between the shield layers in the equivalent circuit of FIG. 4 is 1 pF. It is assumed that the capacitance $C_{TMR}$ of the TMR element or CPP-GMR element itself is 0.01 pF and the load connected across the output terminals is 10 MΩ.

As will be understood from FIG. 5, when the capacitance $C_{shield}$ between the shield layers is 6 pF, the cut-off frequency fc at which the output decreases by 3 dB decreases as the resistance $R_{TMR}$ increases. In order to achieve fc>500 MHz, the resistance $R_{TMR}$ should be less than 50 Ω. This frequency of 500 MHz is an expected frequency to be used at a record density of about 100 Gbits/in$^2$. For TMR or CPP-GMR elements with a recording density of 100 Gbits/in$^2$ or more, it is very difficult to implement such a low resistance value.

Contrary to this, as shown in FIG. 6, when the capacitance $C_{shield}$ between the shield layers is 1 pF, even if the resistance $R_{TMR}$ is higher than 300 Ω, the cut-off frequency fc can be fc>500 MHz. For the resistance $R_{TMR}$ higher than 300 Ω that is a sufficiently realizable value, the frequency characteristic of the thin-film magnetic head can be greatly improved by making the capacitance $C_{shield}$ between the shield layers smaller. The capacitance $C_{TMR}$ of the TMR element or CPP-GMR element itself is much smaller than the capacitance $C_{shield}$ between the shield layers (less than one tenth), and therefore can be of little or no problem.

It is preferred that the additional insulation layer is formed in a recess provided in the lower shield layer at a position where the MR multilayer is absent.

It is also preferred that the additional insulation layer is formed as an under layer of the upper gap layer at a position where the MR multilayer is absent.

Also, according to the present invention, a manufacturing method of an MR thin-film magnetic head provided with an MR multilayer in which a current flows in a direction perpendicular to surfaces of layers of the MR multilayer, includes a step of forming a lower shield layer, a step of forming a recess in a part of the lower shield layer at a position where the MR multilayer is to be absent, a step of forming an additional insulation layer in the recess, a step of forming a lower gap layer of a nonmagnetic electrically conductive material on the lower shield layer at a position where the MR multilayer is to be formed, a step of forming the MR multilayer on the lower gap layer, a step of forming an insulation gap layer of an insulation material at least on the additional insulation layer to surround the lower gap layer and the MR multilayer, a step of forming an upper gap layer of a nonmagnetic electrically conductive material on the MR multilayer and the insulation gap layer, and a step of forming an upper shield layer on the upper gap layer.

Furthermore, according to the present invention, a manufacturing method of an MR thin-film magnetic head provided with an MR multilayer in which a current flows in a direction perpendicular to surfaces of layers of the MR multilayer include a step of forming a lower shield layer, a step of forming a lower gap layer of a nonmagnetic electrically conductive material on the lower shield layer at a position where the MR multilayer is to be formed, a step of forming the MR multilayer on the lower gap layer, a step of forming an insulation gap layer of an insulation material on the lower shield layer to surround the lower gap layer and the MR multilayer, a step of forming an additional insulation layer on the insulation gap layer at a position where the MR multilayer is absent, a step of forming an upper gap layer of a nonmagnetic electrically conductive material on the MR multilayer and the additional insulation layer, and a step of forming an upper shield layer on the upper gap layer.

Still further, according to the present invention, a manufacturing method of an MR thin-film magnetic head provided with an MR multilayer in which a current flows in a direction perpendicular to surfaces of layers of the MR multilayer includes a step of forming a lower shield layer, a step of forming a recess in a part of the lower shield layer at a position where the MR multilayer is to be absent, a step of forming a first additional insulation layer in the recess, a step of forming a lower gap layer of a nonmagnetic electrically conductive material on the lower shield layer at a position where the MR multilayer is to be formed, a step of forming the MR multilayer on the lower gap layer, a step of forming an insulation gap layer of an insulation material at least on the first additional insulation layer to surround the lower gap layer and the MR multilayer, a step of forming a second additional insulation layer on the insulation gap layer at a position where the MR multilayer is absent, a step of forming an upper gap layer of a nonmagnetic electrically conductive material on the MR multilayer and the second additional insulation layer, and a step of forming an upper shield layer on the upper gap layer.

The MR multilayer is preferably a TMR multilayer including a tunnel barrier layer and a pair of ferromagnetic thin-films between which the tunnel barrier is sandwiched, or a CPP-GMR multilayer including a nonmagnetic metal layer, and a pair of ferromagnetic thin-films between which the nonmagnetic metal layer is sandwiched.

Further objects and advantages of the present invention will be apparent from the following description of preferred embodiments of the invention as illustrated in the accompanying drawings.

DESCRIPTION OF THE PREFERRED EMBODIMENTS

Figure 1:
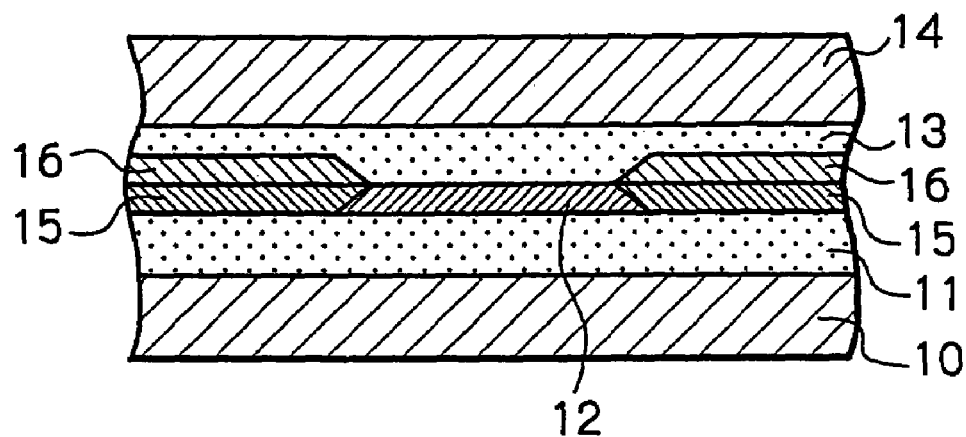
FIG. 1 already disclosed shows a sectional view illustrating a CIP-GMR element with a conventional structure seen from a direction of ABS.
Figure 2:
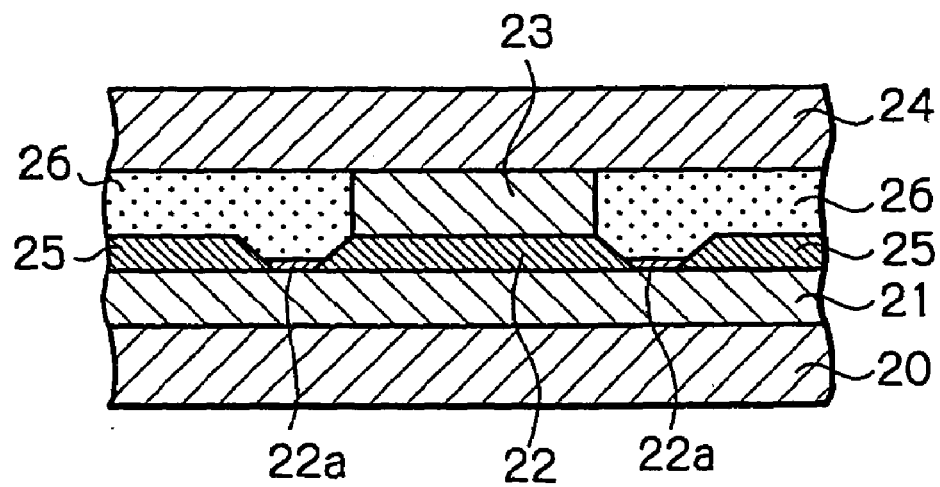
FIG. 2 already disclosed shows a sectional view illustrating a TMR element or a CPP-GMR element with a conventional structure seen from a direction of ABS.
Figure 3:
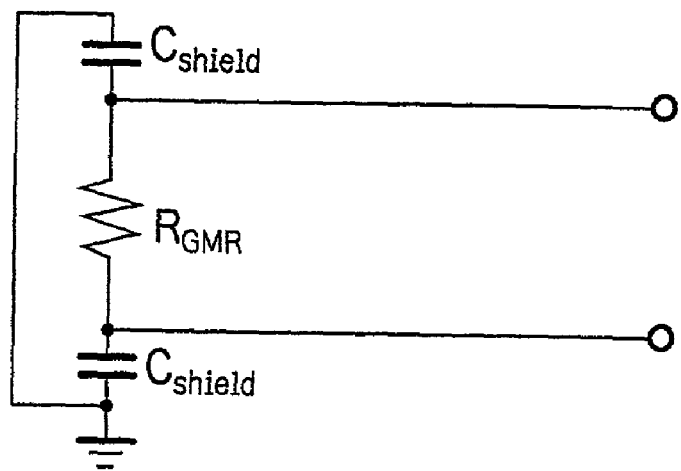
FIG. 3 already disclosed shows an equivalent circuit diagram of the CIP-GMR element.
Figure 4:
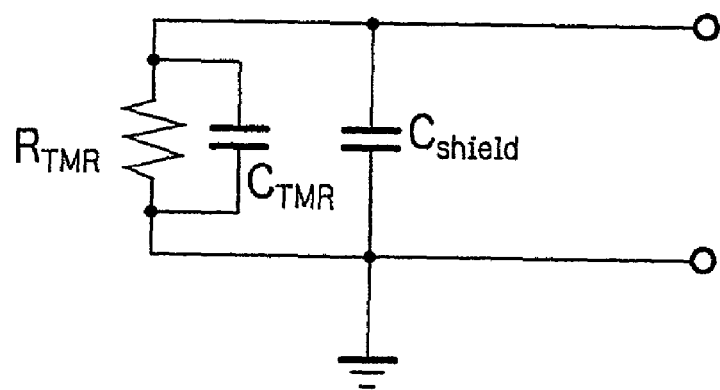
FIG. 4 already disclosed shows an equivalent circuit diagram of the TMR element or the CPP-GMR element.
Figure 5:
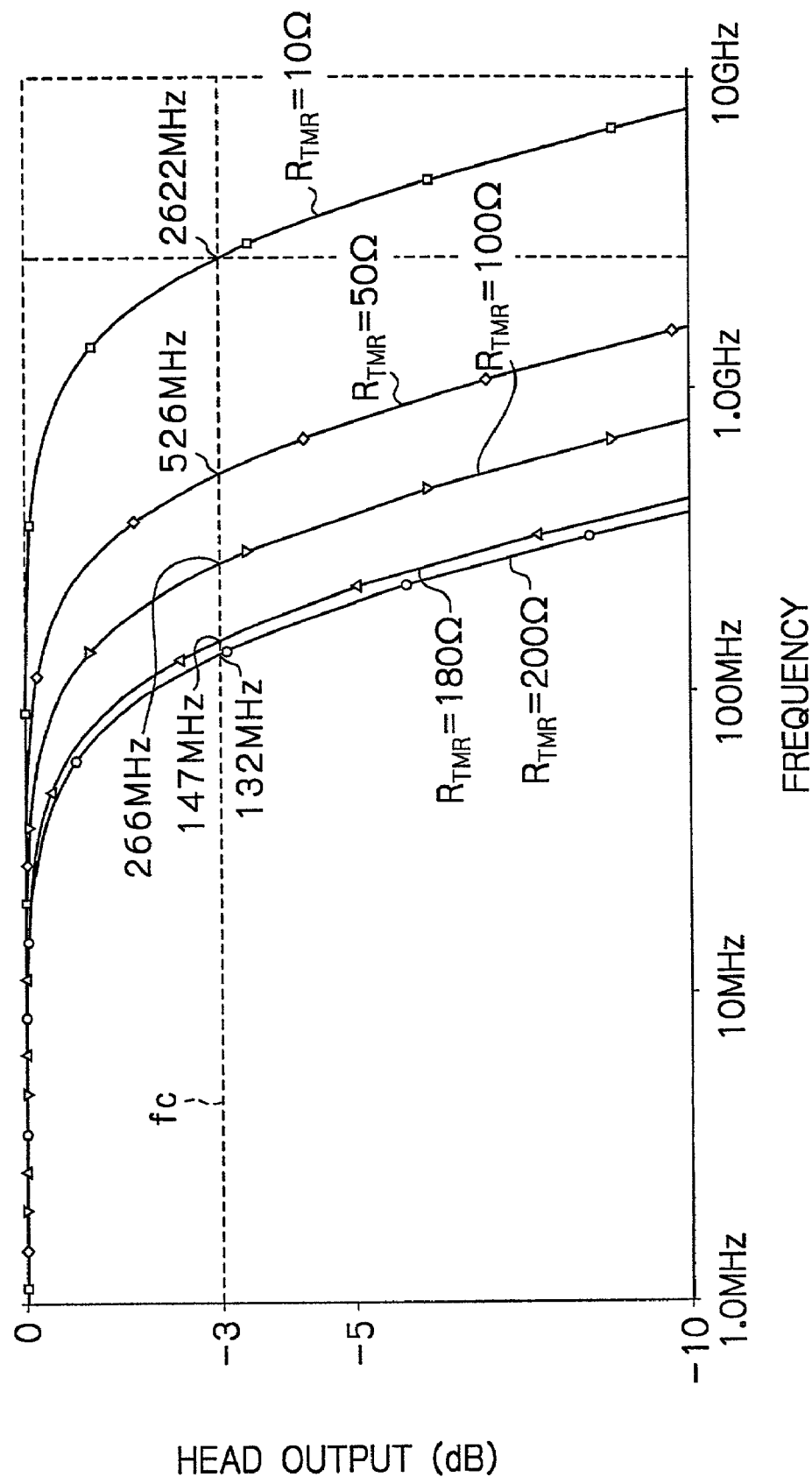
FIG. 5 already disclosed illustrates an attenuation versus frequency characteristic when the capacitance $C_{shield}$ between the shield layers in the equivalent circuit of FIG. 4 is 6 pF.
Figure 6:
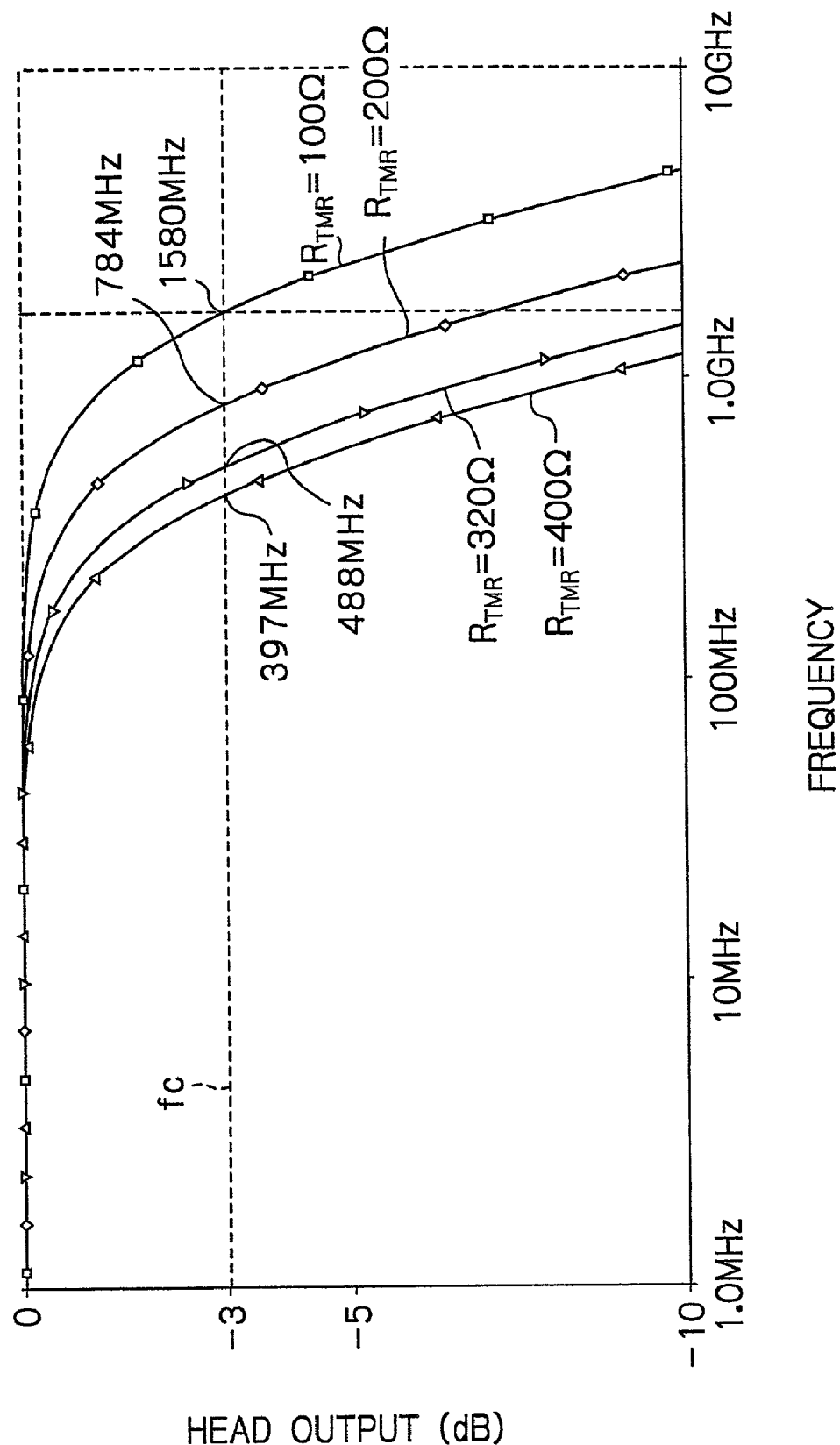
FIG. 6 already disclosed illustrates an attenuation versus frequency characteristic when the capacitance $C_{shield}$ between the shield layers in the equivalent circuit of FIG. 4 is 1 pF.
Figure 7:
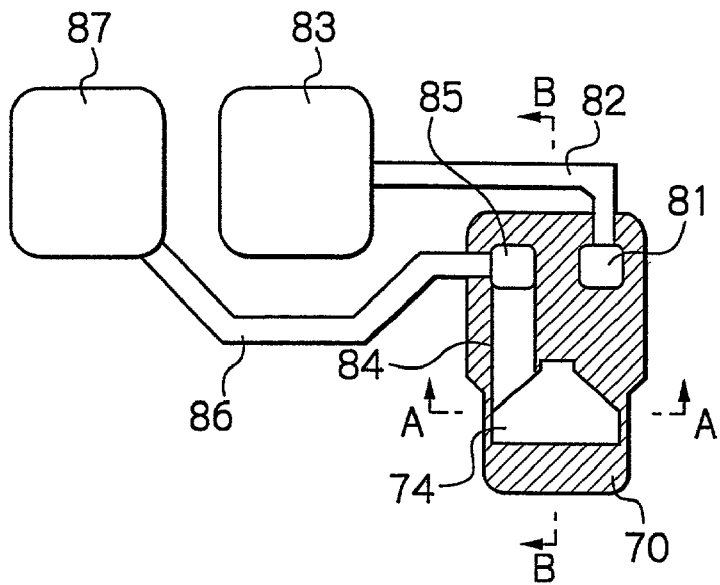
FIG. 7 shows a plane view schematically illustrating, as a first embodiment according to the present invention, a configuration of a lower shield layer, an upper shield layer and lead conductors of a TMR thin-film magnetic head.
Figure 8:
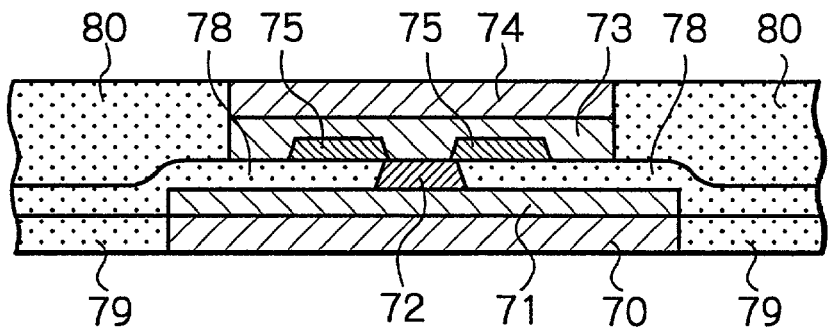
FIG. 8 shows an A—A line sectional view of FIG. 7.
Figure 9:
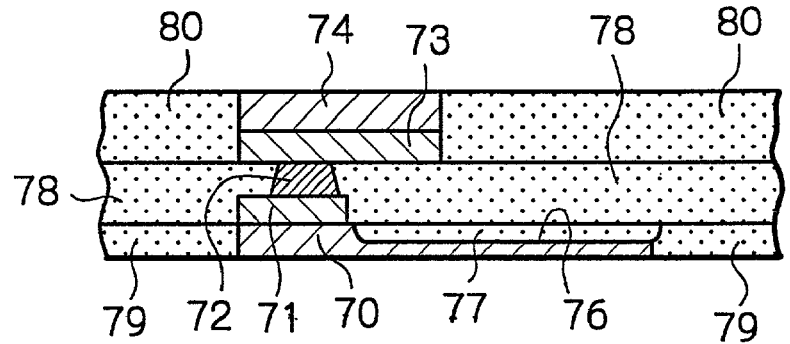
FIG. 9 shows a B—B line sectional view of FIG. 7.

FIG. 7 schematically illustrates an outline of the configuration of a lower shield layer, an upper shield layer, and lead conductors of a TMR thin-film magnetic head before MR height or throat height polishing as a first embodiment according to the present invention, FIG. 8 illustrates an A—A line section of FIG. 7, and FIG. 9 illustrates a B—B line section of FIG. 7.

In FIG. 7, only the lower shield layer, the upper shield layer, the lead conductors connected to the lower shield layer and upper shield layer, and terminal electrodes are shown, but the rest of the structure are omitted. In FIGS. 8 and 9, layers laminated on the upper surface of the upper shield layer are omitted.

Referring to these figures, reference numeral 70 denotes a lower shield layer also serving as an electrode, laminated on a substrate, not shown, 71 denotes a lower gap layer serving also as an electrode, made of a nonmagnetic electrically conductive material, that is laminated on the lower shield layer 70 and is electrically connected with the lower shield layer 70, 72 denotes a TMR multilayer laminated on the lower gap layer 71 and patterned, 73 denotes an upper gap layer also serving as an electrode, made of a nonmagnetic electrically conductive material, this upper gap layer being laminated at least on the TMR multilayer 72, 74 denotes an upper shield layer also serving as an electrode, that is laminated on the upper gap layer 73 and is electrically connected with the upper gap layer 73, 75 denotes hard bias layers for providing a bias magnetic field for magnetic domain control, 76 denotes a recess formed in the lower shield layer 70 from its upper surface at a position where the TMR multilayer 72 is absent, 77 denotes an additional insulation layer formed by imbedding an insulating material in the recess 76, 78 denotes an insulation gap layer of an insulating material that is formed on the additional insulation layer 77 and the lower shield layer 70 to surround the lower gap layer 71 and the TMR multilayer 72, 79 denotes a first insulation layer formed outside of the lower shield layer 70, and 80 denotes a second insulation layer formed on the insulation gap layer 78 outside of the upper gap layer 73 and the upper shield layer 74, respectively.

In FIG. 7, furthermore, reference numeral 81 denotes a first via hole conductor, one end of which is electrically connected to the lower shield layer 70, 82 denotes a first lead conductor, one end of which is electrically connected to the other end of the first via hole conductor 81, 83 denotes a first terminal electrode (connection pad) to which the other end of the first lead conductor 82 is electrically connected, 84 denotes a second lead conductor, one end of which is electrically connected to the upper shield layer 74, 85 denotes a second via hole conductor, one end of which is electrically connected to the other end of the second lead conductor 84, 86 denotes a third lead conductor, one end of which is electrically connected to the other end of the second via hole conductor 85, and 87 denotes a second terminal electrode (connection pad) to which the other end of the third lead conductor 86 is electrically connected, respectively.

The TMR multilayer 72 has a multi-layered structure including at least essential layers such as an anti-ferromagnetic thin-film layer, a lower ferromagnetic thin-film layer (pinned layer), a tunnel barrier layer and an upper ferromagnetic thin-film layer (free layer), not shown in the figure.

The upper ferromagnetic thin-film layer (free layer) is formed basically such that the direction of magnetization freely changes depending upon an applied external magnetic field. The lower ferromagnetic thin-film layer (pinned layer) is formed such that the direction of magnetization is fixed to a desired orientation according to an exchange coupling bias magnetic field between the lower ferromagnetic thin-film layer and the anti-ferromagnetic thin-film layer.

The lower shield layer 70 and the upper shield layer 74 are formed in a single layer structure or a multilayer structure of, for example, NiFe (permalloy), sendust, CoFe, CoFeNi or CoZrNb. A film thickness is in the range of 0.5 to 4 μm, preferably 1 to 3 μm.

The lower gap layer 71 and the upper gap layer 73 are made of a nonmagnetic electrically conductive material such as Ta, Cu, Al, Ag, Au, Ti, TiW, Rh, Cr, In, Ir, Mg, Ru, W, Zn, PtMn or RuRhMn, or alloys of these materials. A film thickness is in the range of 5 to 70 nm, preferably 10 to 50 nm.

The lower ferromagnetic thin-film layer (pinned layer) and the upper ferromagnetic thin-film layer (free layer) of the TMR multilayer 72 are preferably made of a high spin polarization material, and are formed in a single layer structure or a multilayer structure of, for example, Fe, Co, Ni, CoFe, NiFe, CoZrNb or CoFeNi. The lower ferromagnetic thin-film layer (pinned layer) has a thickness in the range of 1 to 10 nm, preferably 2 to 5 nm. Too large thickness of the pinned layer weakens the exchange coupling bias magnetic field between this layer and the anti-ferromagnetic thin-film layer, and too small thickness reduces TMR ratio. A thickness of the upper ferromagnetic thin-film layer (free layer) is in the range of 2 to 50 nm, preferably 4 to 30 nm. If the thickness of the free layer is too large, the output of the head decreases and becomes unstable due to, for example, Barkhausen noise. If the thickness is too small, the output decreases due to the deterioration of TMR effect.

The tunnel barrier layer of the TMR multilayer 72 is made of, for example, $Al_2O_3$, NiO, GdO, MgO, $Ta_2O_5$, $MoO_2$, $TiO_2$ or $WO_2$. A thickness of the tunnel barrier layer is in the range of about 0.5 to 2 nm. In order to make a low-resistance element, the thickness of the tunnel barrier layer should be as small as possible. However, too thin layer is not desirable because it may cause pinholes which in turn cause leakage current.

The anti-ferromagnetic thin-film layer of the TMR multilayer 72 is made of, for example, PtMn or RuRhMn but other common anti-ferromagnetic materials may be used. A thickness is in the range of about 6 to 30 nm.

The additional insulation layer 77, the insulation gap layer 78, the first insulation layer 79 and the second insulation layer 80 are usually made of $Al_2O_3$.

The first and second via hole conductors 81 and 85, the first, second and third lead conductors 82, 84 and 86 and the first and second terminal electrodes (connection pads) 83 and 87 are made of, for example, Cu, Al, Au or Ag. The second lead conductor 84, one end of which is electrically connected to the upper shield layer 74 may be formed of the same material as that of the upper shield layer 74.

An important aspect of this embodiment is that the recess 76 is provided in the lower shield layer 70 at a position where the MR multilayer 72 is absent and the additional insulation layer 77 is imbedded in the recess 76 so that a distance between the lower shield layer 70 and the upper gap layer 73 effectively increases. As a result, the capacitance $C_{shield}$ between the lower and upper shield layers 70 and 74 is reduced to extremely improve the frequency characteristics of the thin-film magnetic head.

In an actually fabricated TMR head sample according to the first embodiment shown in FIG. 7, the area S of the conductor or electrode having the potential of the upper shield layer 74 and located above the lower shield layer 70, in other words the area serving as electrode of a capacitance was S=10230 μm² (calculated by CAD). The capacitance $C_{shield}$ between the lower shield layer 70 and the upper shield layer 74 was $C_{shield}$=5.2 pF and the cut-off frequency fc was fc=235 MHz. The distance between the lower shield layer 70 and the upper shield layer 74 was 110 nm. Of which, the film thickness of the insulation gap layer 78 of $Al_2O_3$ was 52 nm, the depth of the recess 76 was 150 nm, therefore the thickness of the additional insulation layer 77 was also 150 nm, and the resistance $R_{HGA}$ of the TMR head including the leads was $R_{HGA}$=130 Ω. The measured values and calculated values of the capacitance $C_{shield}$ and the cut-off frequency fc are in fairly good agreement. For example, the cut-off frequency fc can be calculated from $fc=1/(2\pi R_{HGA}C_{shield})$.

The measured or calculated TMR head sample had a TMR multilayer of a laminated structure of NiCr (3 nm) as an under layer, PtMn (14 nm) as an anti-ferromagnetic thin-film layer, CoFe (2 nm)/Ru (0.8 nm)/CoFe (2 nm) as a lower ferromagnetic thin-film layer (pinned layer), $AlO_X$ as a tunnel barrier layer, CoFe (2 nm)/NiFe (4 nm) as an upper ferromagnetic thin-film layer (free layer), and NiCr (3 nm) as a cap layer, all of which are sequentially laminated in this order.

Whereas, according to the conventional TMR head with no additional insulation layer, the capacitance $C_{shield}$ between the lower shield layer 70 and the upper shield layer 74 was $C_{shield}$=10.2 pF and the cut-off frequency fc was fc=120 MHz. Therefore, the capacitance $C_{shield}$ has decreased from $C_{shield}$=10.2 pF of the conventional art to 5.2 pF of the first embodiment. This improves the frequency characteristic of the head greatly.

FIGS. 10a to 10k are illustrate the manufacturing stages of a TMR thin-film magnetic head according to the first embodiment. The method of manufacturing the TMR thin-film magnetic head in this first embodiment will be described with reference to these figures.

Figure 10A:
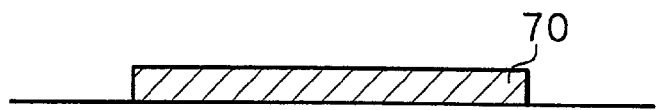
FIGS. 10a to 10k show sectional views illustrating a part of a manufacturing process of the TMR thin-film magnetic head according to the first embodiment.
Figure 10B:
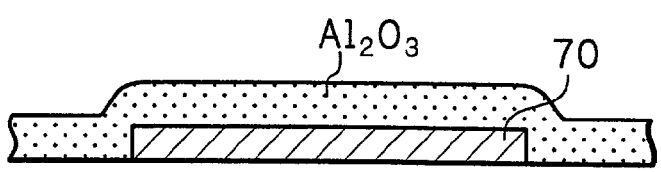
Figure 10C:

First, as shown in FIG. 10a, the lower shield layer 70 is deposited and patterned. Then, as shown in FIG. 10b, an insulation layer of $Al_2O_3$ is deposited on the lower shield layer 70 and subjected to a chemical mechanical polishing (CMP) process to form a flat surface, thereby forming the first insulation layer 79 as shown in FIG. 10c.

Figure 10D:
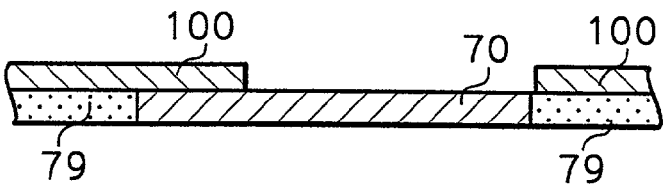
Figure 10E:
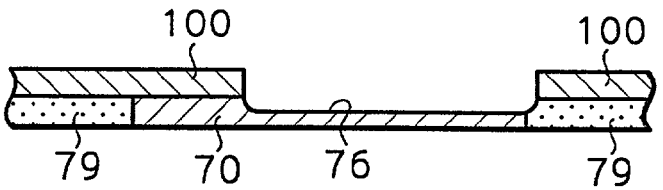

Then, a resist material is coated thereon and the coated resist layer is patterned to form a resist pattern 100 as shown in FIG. 10d. This resist pattern 100 has an opening to expose a part of the lower shield layer 70 at a position where the TMR multilayer 72 is absent. Then, as shown in FIG. 10e, ion milling is carried out through the resist pattern 100 to form the recess 76 in the lower shield layer 70 at a position where the TMR multilayer 72 is absent.

Figure 10F:
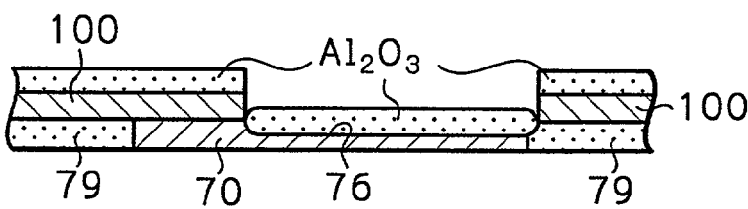
Figure 10G:
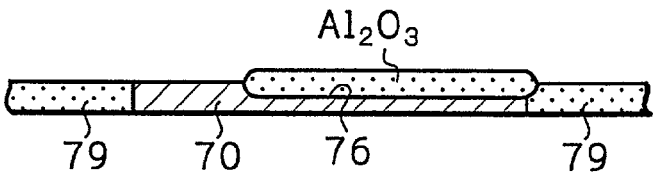
Figure 10H:
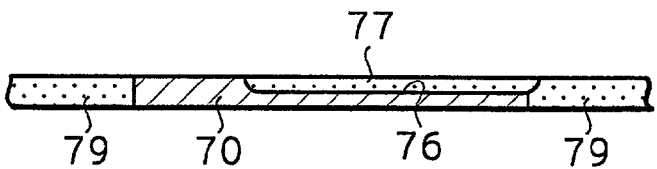

Then, as shown in FIG. 10f, an insulation layer of $Al_2O_3$ is deposited thereon, and thereafter, as shown in FIG. 10g, a lift-off process is performed to remove the resist pattern 100 and the unnecessary insulation layer on the pattern 100. Then, a CMP process is performed to make the surface flat to form the additional insulation layer 77 that fills the recess 76 as shown in FIG. 10h.

Figure 10I:
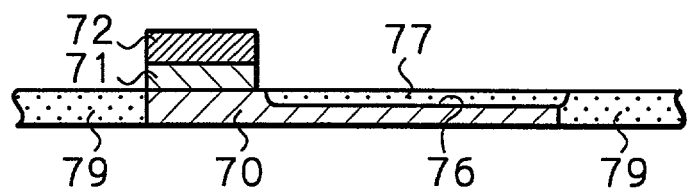
Figure 10J:
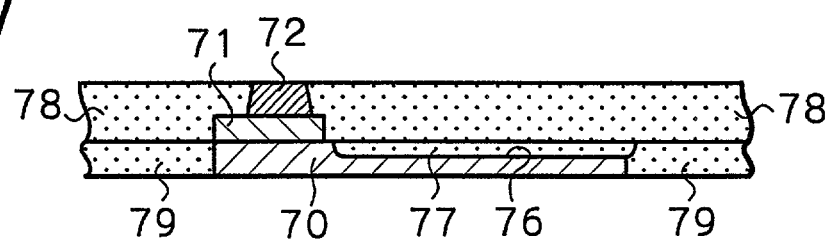

Then, as shown in FIG. 10i, the lower gap layer 71 is formed on the lower shield layer 70 at a predetermined position, and then the TMR multilayer 72 is deposited on the lower gap layer 71. Then, as shown in FIG. 10j, the deposited TMR multilayer 72 is patterned to form a junction, and then the insulation gap layer 78 of $Al_2O_3$ is deposited on the lower shield layer 70, the additional insulation layer 77 and the first insulation layer 79, outside of the lower gap layer 71 and the TMR multilayer 72.

Figure 10K:
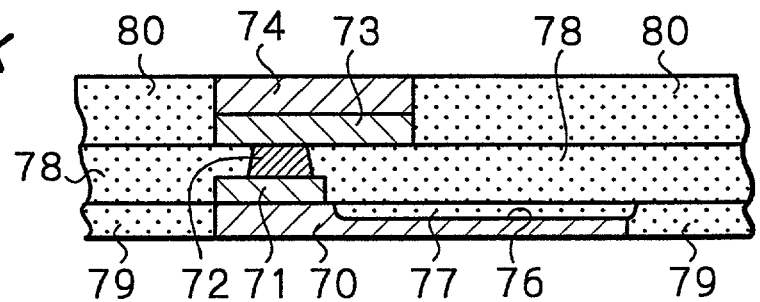

Then, after forming the hard magnet layers 75 (FIG. 8), the upper gap layer 73 and upper shield layer 74 are formed on the TMR multilayer 72 and the insulation gap layer 78, and the second insulation layer 80 of $Al_2O_3$ is deposited on the insulation gap layer 78, outside of the upper gap layer 73 and the upper shield layer 74, as shown in FIG. 10k.

Figure 11:
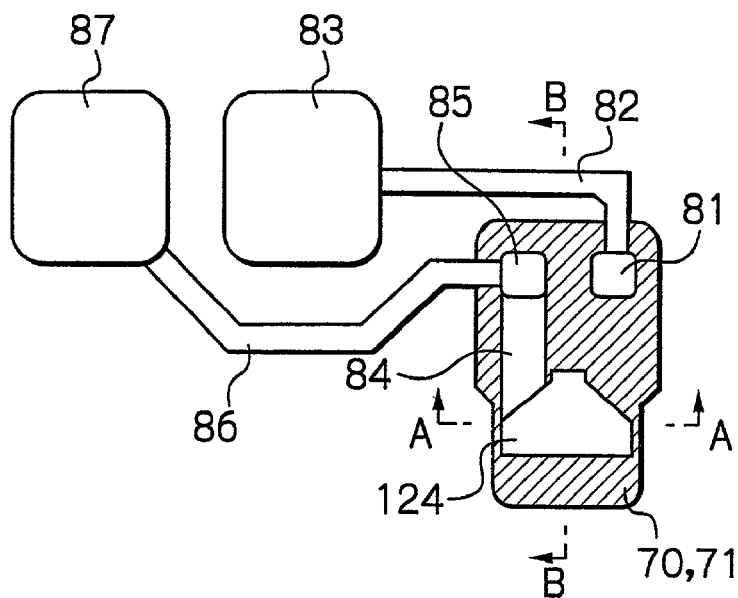
FIG. 11 shows a plane view schematically illustrating, as a second embodiment according to the present invention, a configuration of a lower shield layer, an upper shield layer and lead conductors of a TMR thin-film magnetic head.
Figure 12:
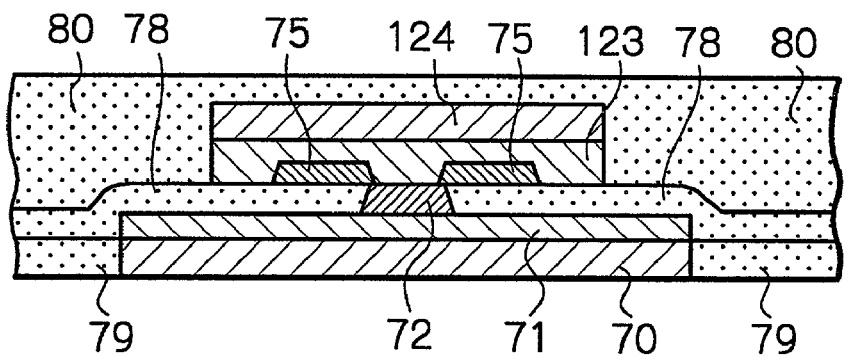
FIG. 12 shows an A—A line sectional view of FIG. 11.
Figure 13:
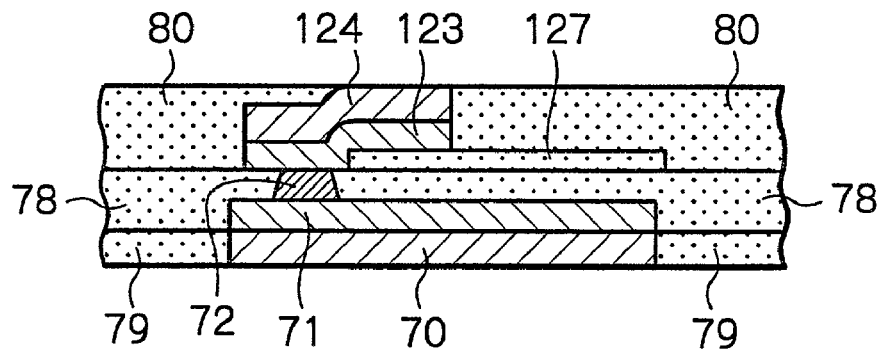
FIG. 13 shows a B—B line sectional view of FIG. 11.

FIG. 11 schematically illustrates an outline of the configuration of a lower shield layer, an upper shield layer, and lead conductors of a TMR thin-film magnetic head before MR height or throat height polishing as a second embodiment according to the present invention, FIG. 12 illustrates an A—A line section of FIG. 11, and FIG. 13 illustrates a B—B line section of FIG. 11.

In FIG. 11, only the lower shield layer, the upper shield layer, the lead conductors connected to the lower shield layer and upper shield layer, and terminal electrodes are shown, but the rest of the structure are omitted. In FIGS. 12 and 13, layers laminated on the upper surface of the upper shield layer are omitted.

The second embodiment differs from the first embodiment in that an additional insulation layer is formed as an under layer of an upper gap layer 123 in order to increase the distance between the lower shield layer 70 and the upper gap layer 123. The other structure of the second embodiment is exactly the same as that of the first embodiment. Thus, in these figures, elements similar to those in FIGS. 7 to 9 of the first embodiment are given the same reference numerals.

Referring to FIGS. 11 to 13, reference numeral 70 denotes a lower shield layer also serving as an electrode, laminated on a substrate, not shown, 71 denotes a lower gap layer serving also as an electrode, made of a nonmagnetic electrically conductive material, that is laminated on the lower shield layer 70 and is electrically connected with the lower shield layer 70, 72 denotes a TMR multilayer laminated on the lower gap layer 71 and patterned, 123 denotes an upper gap layer also serving as an electrode, made of a nonmagnetic electrically conductive material, this upper gap layer being laminated on the TMR multilayer 72 and on an additional insulation layer 127, 124 denotes an upper shield layer also serving as an electrode, that is laminated on the upper gap layer 123 and is electrically connected with the upper gap layer 123, 75 denotes hard bias layers for providing a bias magnetic field for magnetic domain control, 78 denotes an insulation gap layer of an insulating material that is formed on the lower shield layer 70 to surround the lower gap layer 71 and the TMR multilayer 72, 127 denotes the additional insulation layer formed on the insulation gap layer 78 at a position where no TMR multilayer 72 exists, 79 denotes a first insulation layer formed outside of the lower shield layer 70, and 80 denotes a second insulation layer formed on the insulation gap layer 78 outside of the upper gap layer 123 and the upper shield layer 124, respectively.

In FIG. 11, furthermore, reference numeral 81 denotes a first via hole conductor, one end of which is electrically connected to the lower shield layer 70, 82 denotes a first lead conductor, one end of which is electrically connected to the other end of the first via hole conductor 81, 83 denotes a first terminal electrode (connection pad) to which the other end of the first lead conductor 82 is electrically connected, 84 denotes a second lead conductor, one end of which is electrically connected to the upper shield layer 124, 85 denotes a second via hole conductor, one end of which is electrically connected to the other end of the second lead conductor 84, 86 denotes a third lead conductor, one end of which is electrically connected to the other end of the second via hole conductor 85, and 87 denotes a second terminal electrode (connection pad) to which the other end of the third lead conductor 86 is electrically connected, respectively.

The TMR multilayer 72 has a multi-layered structure including at least essential layers such as an anti-ferromagnetic thin-film layer, a lower ferromagnetic thin-film layer (pinned layer), a tunnel barrier layer and an upper ferromagnetic thin-film layer (free layer), not shown in the figure.

The upper ferromagnetic thin-film layer (free layer) of the TMR multilayer 72 is formed basically such that the direction of magnetization freely changes depending upon an applied external magnetic field. The lower ferromagnetic thin-film layer (pinned layer) of the TMR multilayer 72 is formed such that the direction of magnetization is fixed to a desired orientation according to an exchange coupling bias magnetic field between the lower ferromagnetic thin-film layer and the anti-ferromagnetic thin-film layer.

The lower shield layer 70 and the upper shield layer 124 are formed in a single layer structure or a multilayer structure of, for example, NiFe (permalloy), sendust, CoFe, CoFeNi or CoZrNb. A film thickness is in the range of 0.5 to 4 μm, preferably 1 to 3 μm.

The lower gap layer 71 and the upper gap layer 123 are made of a nonmagnetic electrically conductive material such as Ta, Cu, Al, Ag, Au, Ti, TiW, Rh, Cr, In, Ir, Mg, Ru, W, Zn, PtMn or RuRhMn, or alloys of these materials. A film thickness is in the range of 5 to 70 nm, preferably 10 to 50 nm.

The lower ferromagnetic thin-film layer (pinned layer) and the upper ferromagnetic thin-film layer (free layer) of the TMR multilayer 72 are preferably made of a high spin polarization material, and are formed in a single layer structure or a multilayer structure of, for example, Fe, Co, Ni, CoFe, NiFe, CoZrNb or CoFeNi. The lower ferromagnetic thin-film layer (pinned layer) has a thickness in the range of 1 to 10 nm, preferably 2 to 5 nm. Too large thickness of the pinned layer weakens the exchange coupling bias magnetic field between this layer and the anti-ferromagnetic thin-film layer, and too small thickness reduces TMR ratio. A thickness of the upper ferromagnetic thin-film layer (free layer) is in the range of 2 to 50 nm, preferably 4 to 30 nm. If the thickness of the free layer is too large, the output of the head decreases and becomes unstable due to, for example, Barkhausen noise. If the thickness is too small, the output decreases due to the deterioration of TMR effect.

The tunnel barrier layer of the TMR multilayer 72 is made of, for example, $Al_2O_3$, NiO, GdO, MgO, $Ta_2O_5$, $MoO_2$, $TiO_2$ or $WO_2$. A thickness of the tunnel barrier layer is in the range of about 0.5 to 2 nm. In order to make a low-resistance element, the thickness of the tunnel barrier layer should be as small as possible. However, too thin layer is not desirable because it may cause pinholes which in turn cause leakage current.

The anti-ferromagnetic thin-film layer of the TMR multilayer 72 is made of, for example, PtMn or RuRhMn but other common anti-ferromagnetic materials may be used. A thickness is in the range of about 6 to 30 nm.

The additional insulation layer 127, the insulation gap layer 78, the first insulation layer 79 and the second insulation layer 80 are usually made of $Al_2O_3$.

The first and second via hole conductors 81 and 85, the first, second and third lead conductors 82, 84 and 86 and the first and second terminal electrodes (connection pads) 83 and 87 are made of, for example, Cu, Al, Au or Ag. The second lead conductor 84, one end of which is electrically connected to the upper shield layer 124 may be formed of the same material as that of the upper shield layer 124.

An important aspect of this embodiment is that the additional insulation layer 127 is formed on the insulation gap layer 78 at a position where the MR multilayer 72 is absent so that a distance between the lower shield layer 70 and the upper gap layer 123 effectively increases. As a result, the capacitance $C_{shield}$ between the lower and upper shield layers 70 and 124 is reduced to extremely improve the frequency characteristics of the thin-film magnetic head.

In an actually fabricated TMR head sample according to the second embodiment shown in FIG. 11, the area S of the conductor or electrode having the potential of the upper shield layer 124 and located above the lower shield layer 70, in other words the area serving as electrode of a capacitance was S=10230 μm² (calculated by CAD). The capacitance $C_{shield}$ between the lower shield layer 70 and the upper shield layer 124 was $C_{shield}$=5.2 pF and the cut-off frequency fc was fc=235 MHz. The distance between the lower shield layer 70 and the upper shield layer 124 was 110 nm. Of which, the film thickness of the insulation gap layer 78 of $Al_2O_3$ was 52 nm, the thickness of the additional insulation layer 127 was 150 nm, and the resistance $R_{HGA}$ of the TMR head including the leads was $R_{HGA}$=130 Ω. Whereas, according to the conventional TMR head with no additional insulation layer 127, the capacitance $C_{shield}$ between the lower shield layer 70 and the upper shield layer 124 was $C_{shield}$=10.2 pF and the cut-off frequency fc was fc=120 MHz. Therefore, the capacitance $C_{shield}$ has decreased from $C_{shield}$=10.2 pF of the conventional art to 5.2 pF of the second embodiment. This improves the frequency characteristic of the head greatly.

The other configuration, material, film thickness, effects and advantages, and modifications in the second embodiment are the same as those in the first embodiment.

FIGS. 14a to 14i are illustrate the manufacturing stages of a TMR thin-film magnetic head according to the second embodiment. The method of manufacturing the TMR thin-film magnetic head in this second embodiment will be described with reference to these figures.

Figure 14A:
FIGS. 14a to 14i show sectional views illustrating a part of a manufacturing process of the TMR thin-film magnetic head according to the second embodiment.
Figure 14B:
Figure 14C:

First, as shown in FIG. 14a, the lower shield layer 70 is deposited and patterned. Then, as shown in FIG. 14b, an insulation layer of $Al_2O_3$ is deposited on the lower shield layer 70 and subjected to a CMP process to form a flat surface, thereby forming the first insulation layer 79 as shown in FIG. 14c.

Figure 14D:
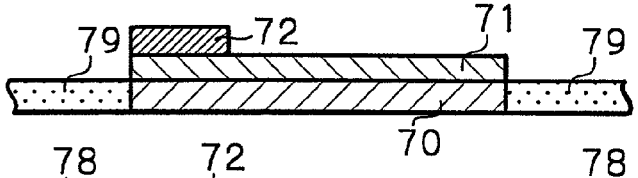
Figure 14E:
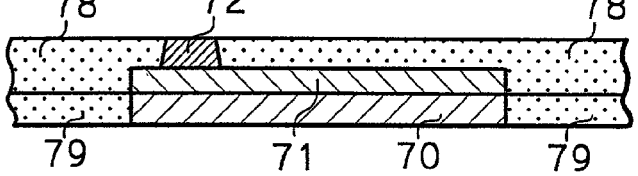

Then, as shown in FIG. 14d, the lower gap layer 71 is deposited on the lower shield layer 70, and the TMR multilayer 72 is deposited on the lower gap layer 71 at a predetermined position. Thereafter, as shown in FIG. 14e, the deposited TMR multilayer 72 is patterned to form a junction, and then the insulation gap layer 78 of $Al_2O_3$ is deposited on the lower gap layer 71 and the first insulation layer 79 outside of the TMR multilayer 72.

Figure 14F:
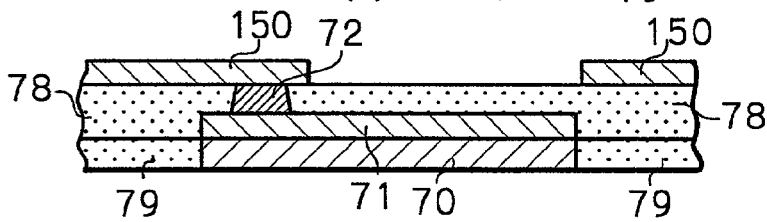

Then, after forming the hard magnet layers 75 (FIG. 12), a resist material is coated thereon and the coated resist layer is patterned to form a resist pattern 150 as shown in FIG. 14f. This resist pattern 150 has an opening to expose a part of the insulation gap layer 78 at a position where the TMR multilayer 72 is absent.

Figure 14G:
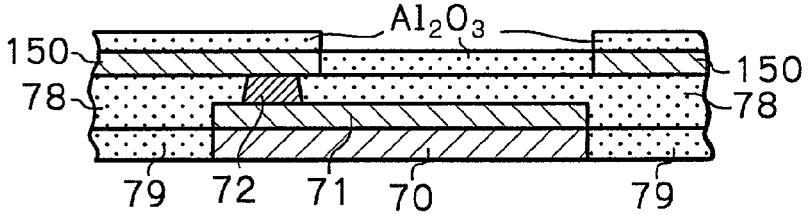
Figure 14H:
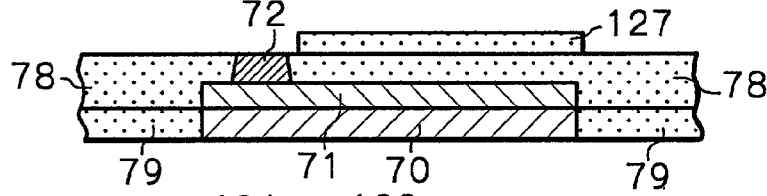

Then, as shown in FIG. 14g, an insulation layer of $Al_2O_3$ is deposited thereon, and thereafter, as shown in FIG. 14h, a lift-off process is performed to remove the resist pattern 150 and the unnecessary insulation layer on the pattern 150. Thereby, the additional insulation layer 127 formed on the insulation gap layer 78 at a position where the TMR multilayer 72 is absent can be provided.

Figure 14I:
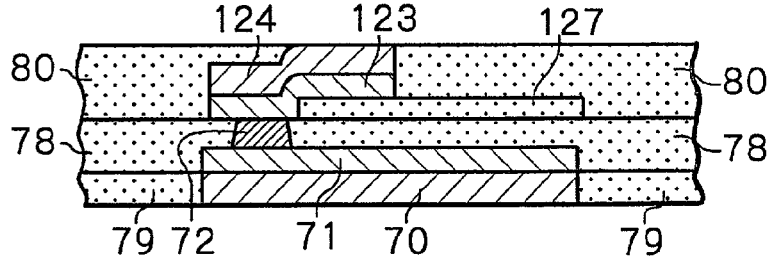

Then, as shown in FIG. 14i, the upper gap layer 123 and the upper shield layer 124 are formed on the TMR multilayer 72 and on the additional insulation layer 127, and the second insulation layer 80 of $Al_2O_3$ is formed on the insulation gap layer 78 and on the additional insulation layer 127 outside of the upper gap layer 123 and the upper shield layer 124.

Figure 15:
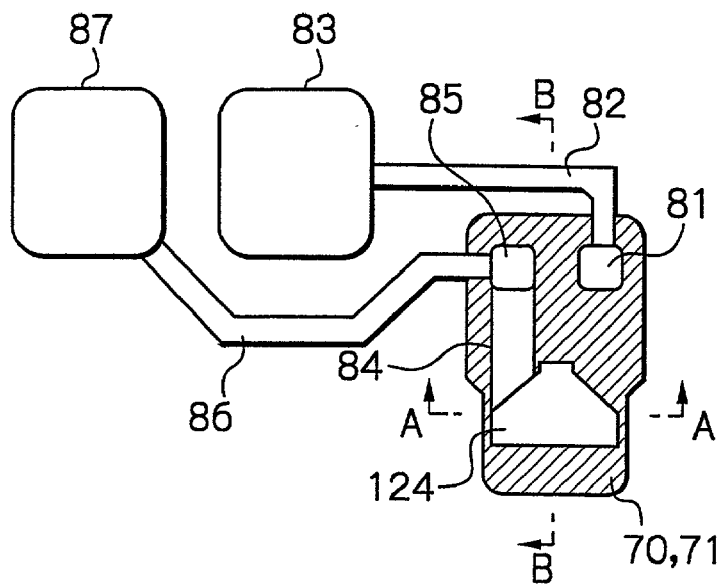
FIG. 15 shows a plane view schematically illustrating, as a third embodiment according to the present invention, a configuration of a lower shield layer, an upper shield layer and lead conductors of a TMR thin-film magnetic head.
Figure 16:
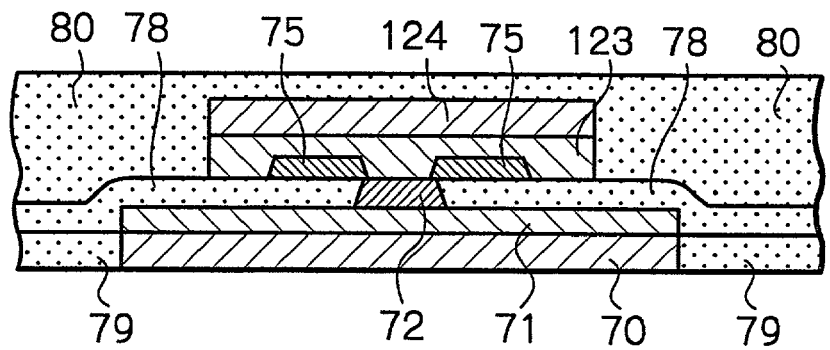
FIG. 16 shows an A—A line sectional view of FIG. 15.
Figure 17:
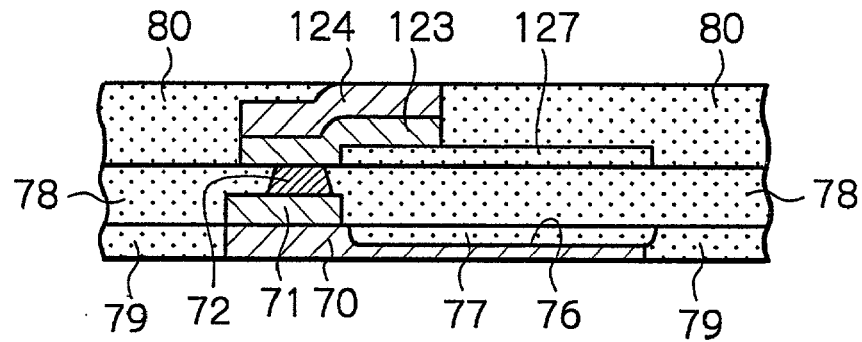
FIG. 17 shows a B—B line sectional view of FIG. 15.

FIG. 15 schematically illustrates an outline of the configuration of a lower shield layer, an upper shield layer, and lead conductors of a TMR thin-film magnetic head before MR height or throat height polishing as a third embodiment according to the present invention, FIG. 16 illustrates an A—A line section of FIG. 15, and FIG. 17 illustrates a B—B line section of FIG. 15.

In FIG. 15, only the lower shield layer, the upper shield layer, the lead conductors connected to the lower shield layer and upper shield layer, and terminal electrodes are shown, but the rest of the structure are omitted. In FIGS. 16 and 17, layers laminated on the upper surface of the upper shield layer are omitted.

The third embodiment is a combination of the first embodiment and the second embodiment. The other structure of the third embodiment is exactly the same as that of the first and second embodiments. Thus, in these figures, elements similar to those in FIGS. 7 to 9 of the first embodiment and FIGS. 11 to 13 of the second embodiment are given the same reference numerals.

Referring to FIGS. 15 to 17, reference numeral 70 denotes a lower shield layer also serving as an electrode, laminated on a substrate, not shown, 71 denotes a lower gap layer serving also as an electrode, made of a nonmagnetic electrically conductive material, that is laminated on the lower shield layer 70 and is electrically connected with the lower shield layer 70, 72 denotes a TMR multilayer laminated on the lower gap layer 71 and patterned, 123 denotes an upper gap layer also serving as an electrode, made of a nonmagnetic electrically conductive material, this upper gap layer being laminated on the TMR multilayer 72 and on a second additional insulation layer 127, 124 denotes an upper shield layer also serving as an electrode, that is laminated on the upper gap layer 123 and is electrically connected with the upper gap layer 123, 75 denotes hard bias layers for providing a bias magnetic field for magnetic domain control, 76 denotes a recess formed in the lower shield layer 70 from its upper surface at a position where the TMR multi-layer 72 is absent, 77 denotes a first additional insulation layer formed by imbedding an insulating material in the recess 76, 78 denotes an insulation gap layer of an insulating material that is formed on the lower shield layer 70 to surround the lower gap layer 71 and the TMR multilayer 72, 127 denotes the second additional insulation layer formed on the insulation gap layer 78 at a position where no TMR multilayer 72 exists, 79 denotes a first insulation layer formed outside of the lower shield layer 70, and 80 denotes a second insulation layer formed on the insulation gap layer 78 outside of the upper gap layer 123 and the upper shield layer 124, respectively.

In FIG. 15, furthermore, reference numeral 81 denotes a first via hole conductor, one end of which is electrically connected to the lower shield layer 70, 82 denotes a first lead conductor, one end of which is electrically connected to the other end of the first via hole conductor 81, 83 denotes a first terminal electrode (connection pad) to which the other end of the first lead conductor 82 is electrically connected, 84 denotes a second lead conductor, one end of which is electrically connected to the upper shield layer 124, 85 denotes a second via hole conductor, one end of which is electrically connected to the other end of the second lead conductor 84, 86 denotes a third lead conductor, one end of which is electrically connected to the other end of the second via hole conductor 85, and 87 denotes a second terminal electrode (connection pad) to which the other end of the third lead conductor 86 is electrically connected, respectively.

The TMR multilayer 72 has a multi-layered structure including at least essential layers such as an anti-ferromagnetic thin-film layer, a lower ferromagnetic thin-film layer (pinned layer), a tunnel barrier layer and an upper ferromagnetic thin-film layer (free layer), not shown in the figure.

The upper ferromagnetic thin-film layer (free layer) of the TMR multilayer 72 is formed basically such that the direction of magnetization freely changes depending upon an applied external magnetic field. The lower ferromagnetic thin-film layer (pinned layer) of the TMR multilayer 72 is formed such that the direction of magnetization is fixed to a desired orientation according to an exchange coupling bias magnetic field between the lower ferromagnetic thin-film layer and the anti-ferromagnetic thin-film layer.

The lower shield layer 70 and the upper shield layer 124 are formed in a single layer structure or a multilayer structure of, for example, NiFe (permalloy), sendust, CoFe, CoFeNi or CoZrNb. A film thickness is in the range of 0.5 to 4 μm, preferably 1 to 3 μm.

The lower gap layer 71 and the upper gap layer 123 are made of a nonmagnetic electrically conductive material such as Ta, Cu, Al, Ag, Au, Ti, TiW, Rh, Cr, In, Ir, Mg, Ru, W, Zn, PtMn or RuRhMn, or alloys of these materials. A film thickness is in the range of 5 to 70 nm, preferably 10 to 50 nm.

The lower ferromagnetic thin-film layer (pinned layer) and the upper ferromagnetic thin-film layer (free layer) of the TMR multilayer 72 are preferably made of a high spin polarization material, and are formed in a single layer structure or a multilayer structure of, for example, Fe, Co, Ni, CoFe, NiFe, CoZrNb or CoFeNi. The lower ferromagnetic thin-film layer (pinned layer) has a thickness in the range of 1 to 10 nm, preferably 2 to 5 nm. Too large thickness of the pinned layer weakens the exchange coupling bias magnetic field between this layer and the anti-ferromagnetic thin-film layer, and too small thickness reduces TMR ratio. A thickness of the upper ferromagnetic thin-film layer (free layer) is in the range of 2 to 50 nm, preferably 4 to 30 nm. If the thickness of the free layer is too large, the output of the head decreases and becomes unstable due to, for example, Barkhausen noise. If the thickness is too small, the output decreases due to the deterioration of TMR effect.

The tunnel barrier layer of the TMR multilayer 72 is made of, for example, $Al_2O_3$, NiO, GdO, MgO, $Ta_2O_5$, $MoO_2$, $TiO_2$ or $WO_2$. A thickness of the tunnel barrier layer is in the range of about 0.5 to 2 nm. In order to make a low-resistance element, the thickness of the tunnel barrier layer should be as small as possible. However, too thin layer is not desirable because it may cause pinholes which in turn cause leakage current.

The anti-ferromagnetic thin-film layer of the TMR multilayer 72 is made of, for example, PtMn or RuRhMn but other common anti-ferromagnetic materials may be used. A thickness is in the range of about 6 to 30 nm.

The first and second additional insulation layers 77 and 127, the insulation gap layer 78, the first insulation layer 79 and the second insulation layer 80 are usually made of $Al_2O_3$.

The first and second via hole conductors 81 and 85, the first, second and third lead conductors 82, 84 and 86 and the first and second terminal electrodes (connection pads) 83 and 87 are made of, for example, Cu, Al, Au or Ag. The second lead conductor 84, one end of which is electrically connected to the upper shield layer 124 may be formed of the same material as that of the upper shield layer 124.

An important aspect of this embodiment is that the recess 76 is provided in the lower shield layer 70 at a position where the MR multilayer 72 is absent and the first additional insulation layer 77 is imbedded in the recess 76 and that the second additional insulation layer 127 is formed on the insulation gap layer 78 at a position where the MR multilayer 72 is absent so that a distance between the lower shield layer 70 and the upper gap layer 123 effectively and greatly increases. As a result, the capacitance $C_{shield}$ between the lower and upper shield layers 70 and 124 is reduced to extremely improve the frequency characteristics of the thin-film magnetic head.

In an actually fabricated TMR head sample according to the third embodiment shown in FIG. 15, the area S of the conductor or electrode having the potential of the upper shield layer 124 and located above the lower shield layer 70, in other words the area serving as electrode of a capacitance was S=10230 μm² (calculated by CAD). The capacitance $C_{shield}$ between the lower shield layer 70 and the upper shield layer 124 was $C_{shield}$=4.4 pF and the cut-off frequency fc was fc=278 MHz. The distance between the lower shield layer 70 and the upper shield layer 124 was 110 nm. Of which, the film thickness of the insulation gap layer 78 of $Al_2O_3$ was 52 nm, the thickness of the first additional insulation layer 77 was 150 nm, the thickness of the second additional insulation layer 127 was also 150 nm, and the resistance $R_{HGA}$ of the TMR head including the leads was $R_{HGA}$=130 Ω. Whereas, according to the conventional TMR head with no additional insulation layer 77 nor 127, the capacitance $C_{shield}$ between the lower shield layer 70 and the upper shield layer 124 was $C_{shield}$=10.2 pF and the cut-off frequency fc was fc=120 MHz. Therefore, the capacitance $C_{shield}$ has decreased from $C_{shield}$=10.2 pF of the conventional art to 4.4 pF of the third embodiment. This improves the frequency characteristic of the head greatly.

The other configuration, material, film thickness, effects and advantages, and modifications in the third embodiment are the same as those in the first and second embodiments.

Figure 18A:
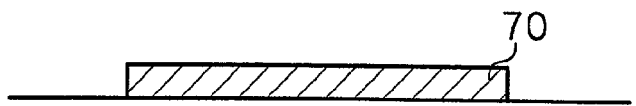
FIGS. 18a to 18n show sectional views illustrating a part of a manufacturing process of the TMR thin-film magnetic head according to the third embodiment.
Figure 18B:
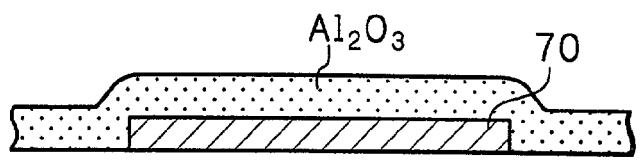
Figure 18C:
Figure 18D:
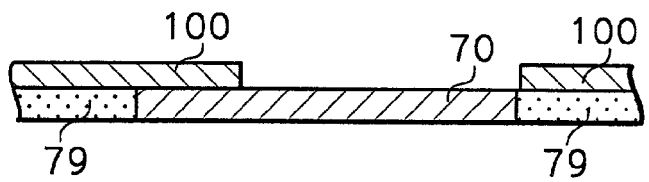
Figure 18E:
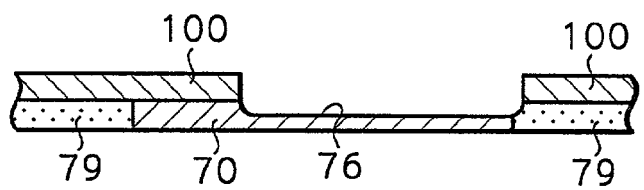
Figure 18F:
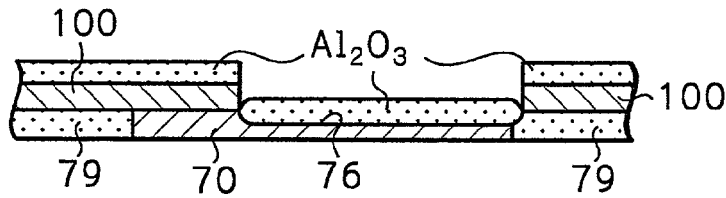
Figure 18G:
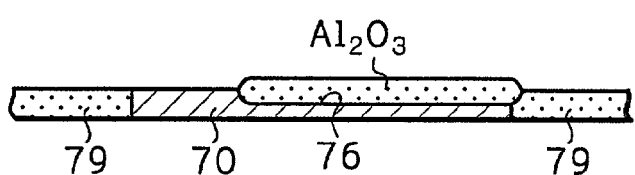
Figure 18H:
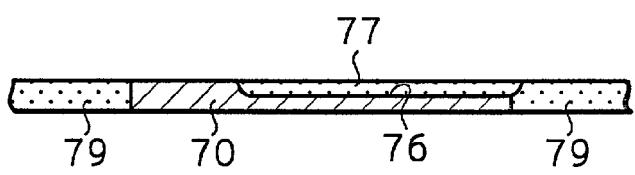
Figure 18I:
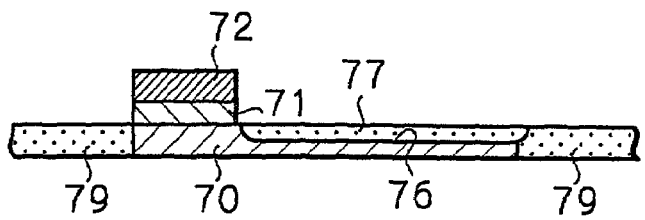
Figure 18J:
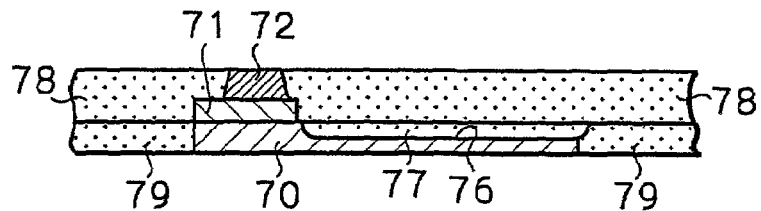
Figure 18K:
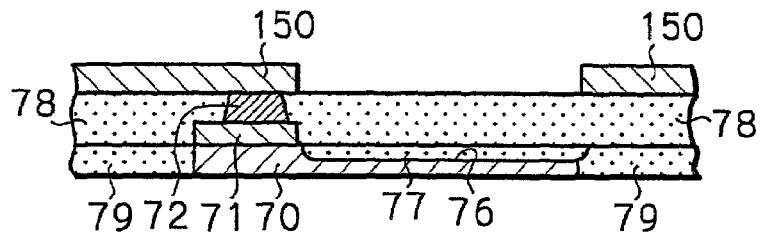
Figure 18L:
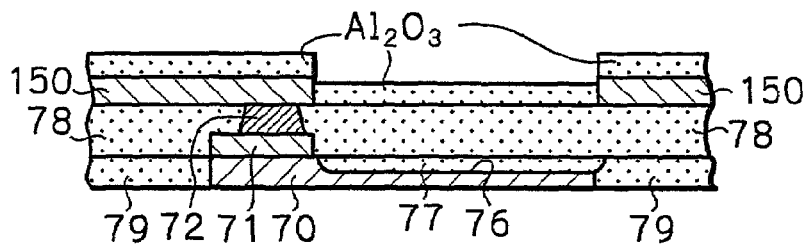
Figure 18M:
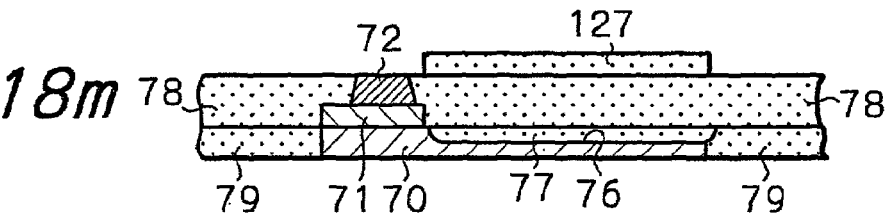
Figure 18N:
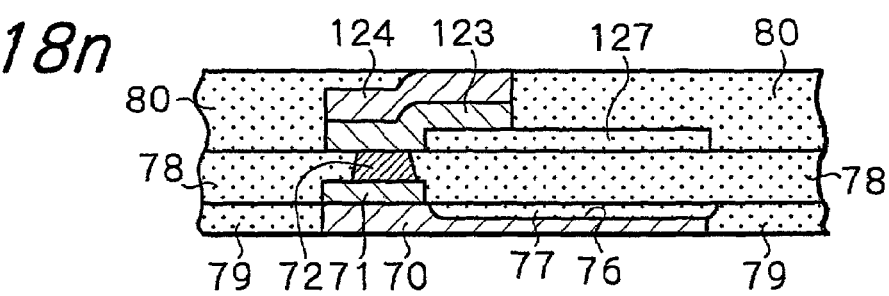

FIGS. 18*a* to 18*n* are illustrate the manufacturing stages of a TMR thin-film magnetic head according to the third embodiment. The method of manufacturing the TMR thin-film magnetic head in this third embodiment will be described with reference to these figures.

First, as shown in FIG. 18*a*, the lower shield layer 70 is deposited and patterned. Then, as shown in FIG. 18*b*, an insulation layer of $Al_2O_3$ is deposited on the lower shield layer 70 and subjected to a CMP process to form a flat surface, thereby forming the first insulation layer 79 as shown in FIG. 18*c*.

Then, a resist material is coated thereon and the coated resist layer is patterned to form a resist pattern 100 as shown in FIG. 18*d*. This resist pattern 100 has an opening to expose a part of the lower shield layer 70 at a position where the TMR multilayer 72 is absent. Then, as shown in FIG. 18*e*, ion milling is carried out through the resist pattern 100 to form the recess 76 in the lower shield layer 70 at a position where the TMR multilayer 72 is absent.

Then, as shown in FIG. 18*f*, an insulation layer of $Al_2O_3$ is deposited thereon, and thereafter, as shown in FIG. 18*g*, a lift-off process is performed to remove the resist pattern 100 and the unnecessary insulation layer on the pattern 100. Then, a CMP process is performed to make the surface flat to form the additional insulation layer 77 that fills the recess 76 as shown in FIG. 18*h*.

Then, as shown in FIG. 18*i*, the lower gap layer 71 is formed on the lower shield layer 70 at a predetermined position, and then the TMR multilayer 72 is deposited on the lower gap layer 71. Then, as shown in FIG. 18*j*, the deposited TMR multilayer 72 is patterned to form a junction, and then the insulation gap layer 78 of $Al_2O_3$ is deposited on the lower shield layer 70, the first additional insulation layer 77 and the first insulation layer 79, outside of the lower gap layer 71 and the TMR multilayer 72.

Then, after forming the hard magnet layers 75 (FIG. 16), a resist material is coated thereon and the coated resist layer is patterned to form a resist pattern 150 as shown in FIG. 18*k*. This resist pattern 150 has an opening to expose a part of the insulation gap layer 78 at a position where the TMR multilayer 72 is absent.

Then, as shown in FIG. 18*n*, an insulation layer of $Al_2O_3$ is deposited thereon, and thereafter, as shown in FIG. 18*m*, a lift-off process is performed to remove the resist pattern 150 and the unnecessary insulation layer on the pattern 150. Thereby, the second additional insulation layer 127 formed on the insulation gap layer 78 at a position where the TMR multilayer 72 is absent can be provided.

Then, as shown in FIG. 18*n*, the upper gap layer 123 and the upper shield layer 124 are formed on the TMR multilayer 72 and on the second additional insulation layer 127, and the second insulation layer 80 of $Al_2O_3$ is formed on the insulation gap layer 78 and on the additional insulation layer 127 outside of the upper gap layer 123 and the upper shield layer 124.

In the aforementioned embodiments and modifications, if the second lead conductor 84 and the second via hole conductor 85 having the same potential as that of the upper shield layer are patterned so that an area of them, opposing the lower shield layer 70 becomes small, the capacitance $C_{shield}$ between the lower and upper shield layers is reduced to improve the frequency characteristics of the thin-film magnetic head.

In the aforementioned embodiments, the insulation gap layer 78, the first additional insulation layer 77 and the second additional insulation layer 127 are made of $Al_2O_3$. In modification, however, a part of or entirety of each layer may be made of an insulation materials such as $Si_3N_4$, $Co\text{-}\gamma Fe_2O_3$ (hematite) or $SiO_2$ that has a lower dielectric constant than $Al_2O_3$ so that the capacitance $C_{shield}$ between the shield layers is further reduced to improve the frequency characteristics of the thin-film magnetic head.

Further, the insulation gap layer 78 may have a larger film thickness than that in the aforementioned first to fourth embodiments. This can be realized by increasing the film thickness of the TRM multilayer 72 itself, or by increasing the film thickness of the lower gap layer 71 only within a region of the TMR multilayer 72. Thus, the capacitance between the shield layers can be more reduced and the frequency characteristic of the thin-film magnetic head can be more improved.

While the aforementioned embodiments have been described with respect to two types of TMR multilayer, the present invention can be applied to a TMR element with an the anti-ferromagnetic layer located at the remote side from the substrate, in other words located at the top side of the multilayer or to TMR elements with any structures. The present invention is similarly applicable to not only TMR heads but also CPP-GMR heads that employ CPP-GMR elements in which a sense current flows in a direction perpendicular to the surfaces of layers.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetoresistive effect thin-film magnetic head, comprising:
    a lower shield layer;
    a lower gap layer made of a nonmagnetic electrically conductive material and laminated on said lower shield layer;
    a magnetoresistive effect multilayer in which a current flows in a direction perpendicular to surfaces of layers of said magnetoresistive effect multilayer, said magnetoresistive effect multilayer being laminated on said lower gap layer;
    an upper gap layer made of a nonmagnetic electrically conductive material and laminated on said magnetoresistive effect multilayer;
    an insulation gap layer made of an insulation material and formed at least between said lower shield layer and said upper gap layer;
    an upper shield layer laminated on said upper gap layer; and
    an additional insulation layer formed so that a distance between said lower shield layer and said upper gap layer increases at a location where said magnetoresistive effect multilayer is absent.

2. The magnetoresistive effect thin-film magnetic head as claimed in claim 1, wherein said additional insulation layer is formed in a recess provided in said lower shield layer at a position where said magnetoresistive effect multilayer is absent.

3. The magnetoresistive effect thin-film magnetic head as claimed in claim 1, wherein said additional insulation layer is formed as an under layer of said upper gap layer at a position where said magnetoresistive effect multilayer is absent.

4. The magnetoresistive effect thin-film magnetic head as claimed in claim 1, wherein said magnetoresistive effect multilayer is a tunnel magnetoresistive effect multilayer including a tunnel barrier layer and a pair of ferromagnetic thin-film layers between which said tunnel barrier layer is sandwiched.

5. The magnetoresistive effect thin-film magnetic head as claimed in claim 1, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

6. A manufacturing method of a magnetoresistive effect thin-film magnetic head provided with a magnetoresistive effect multilayer in which a current flows in a direction perpendicular to surfaces of layers of said magnetoresistive effect multilayer, said method comprising the steps of:
    forming a lower shield layer;
    forming a recess in a part of said lower shield layer at a position where said magnetoresistive effect multilayer is to be absent;
    forming an additional insulation layer in said recess;
    forming a lower gap layer of a nonmagnetic electrically conductive material on said lower shield layer at a position where said magnetoresistive effect multilayer is to be formed;
    forming the magnetoresistive effect multilayer on said lower gap layer;
    forming an insulation gap layer of an insulation material at least on said additional insulation layer to surround said lower gap layer and said magnetoresistive effect multilayer;
    forming an upper gap layer of a nonmagnetic electrically conductive material on said magnetoresistive effect multilayer and said insulation gap layer; and
    forming an upper shield layer on said upper gap layer.

7. The manufacturing method as claimed in claim 6, wherein said forming step of said magnetoresistive effect multilayer comprises forming of a tunnel magnetoresistive effect multilayer including a tunnel barrier layer and a pair of ferromagnetic thin-film layers between which said tunnel barrier layer is sandwiched.

8. The manufacturing method as claimed in claim 6, wherein said forming step of said magnetoresistive effect multilayer comprises forming of a current perpendicular to the plane giant magnetoresistive effect multilayer including a nonmagnetic metal layer, and a pair of ferromagnetic thin-film layers between which said nonmagnetic metal layer is sandwiched.

9. A manufacturing method of a magnetoresistive effect thin-film magnetic head provided with a magnetoresistive effect multilayer in which a current flows in a direction perpendicular to surfaces of layers of said magnetoresistive effect multilayer, said method comprising the steps of:

forming a lower shield layer;
forming a lower gap layer of a nonmagnetic electrically conductive material on said lower shield layer at a position where said magnetoresistive effect multilayer is to be formed;
forming the magnetoresistive effect multilayer on said lower gap layer;
forming an insulation gap layer of an insulation material on said lower shield layer to surround said lower gap layer and said magnetoresistive effect multilayer;
forming an additional insulation layer on said insulation gap layer at a position where said magnetoresistive effect multilayer is absent;
forming an upper gap layer of a nonmagnetic electrically conductive material on said magnetoresistive effect multilayer and said additional insulation layer; and
forming an upper shield layer on said upper gap layer.

10. The manufacturing method as claimed in claim 9, wherein said forming step of said magnetoresistive effect multilayer comprises forming of a tunnel magnetoresistive effect multilayer including a tunnel barrier layer and a pair of ferromagnetic thin-film layers between which said tunnel barrier layer is sandwiched.

11. The manufacturing method as claimed in claim 9, wherein said forming step of said magnetoresistive effect multilayer comprises forming of a current perpendicular to the plane giant magnetoresistive effect multilayer including a nonmagnetic metal layer, and a pair of ferromagnetic thin-film layers between which said nonmagnetic metal layer is sandwiched.

12. A manufacturing method of a magnetoresistive effect thin-film magnetic head provided with a magnetoresistive effect multilayer in which a current flows in a direction perpendicular to surfaces of layers of said magnetoresistive effect multilayer, said method comprising the steps of:
forming a lower shield layer;
forming a recess in a part of said lower shield layer at a position where said magnetoresistive effect multilayer is to be absent;
forming a first additional insulation layer in said recess;
forming a lower gap layer of a nonmagnetic electrically conductive material on said lower shield layer at a position where said magnetoresistive effect multilayer is to be formed;
forming the magnetoresistive effect multilayer on said lower gap layer;
forming an insulation gap layer of an insulation material at least on said first additional insulation layer to surround said lower gap layer and said magnetoresistive effect multilayer;
forming a second additional insulation layer on said insulation gap layer at a position where said magnetoresistive effect multilayer is absent;
forming an upper gap layer of a nonmagnetic electrically conductive material on said magnetoresistive effect multilayer and said second additional insulation layer; and
forming an upper shield layer on said upper gap layer.

13. The manufacturing method as claimed in claim 12, wherein said forming step of said magnetoresistive effect multilayer comprises forming of a tunnel magnetoresistive effect multilayer including a tunnel barrier layer and a pair of ferromagnetic thin-film layers between which said tunnel barrier layer is sandwiched.

14. The manufacturing method as claimed in claim 12, wherein said forming step of said magnetoresistive effect multilayer comprises forming of a current perpendicular to the plane giant magnetoresistive effect multilayer including a nonmagnetic metal layer, and a pair of ferromagnetic thin-film layers between which said nonmagnetic metal layer is sandwiched.

* * * * *